United States Patent [19]

Puschmann

[11] 4,297,585

[45] Oct. 27, 1981

[54] SYSTEM FOR THE DETECTION OF SPLICING DEFECTS IN FILM

[75] Inventor: Werner Puschmann, Langenfeld, Fed. Rep. of Germany

[73] Assignee: AGFA-Gevaert Aktiengesellschaft, Leverkusen, Fed. Rep. of Germany

[21] Appl. No.: 107,652

[22] Filed: Dec. 27, 1979

[30] Foreign Application Priority Data

Dec. 29, 1978 [DE] Fed. Rep. of Germany ....... 2856705

[51] Int. Cl.³ ............................................. G01N 21/86
[52] U.S. Cl. .................................... 250/560; 250/570
[58] Field of Search .............. 250/562, 563, 559, 570, 250/571, 572, 560, 561; 356/383–386

[56] References Cited

U.S. PATENT DOCUMENTS

3,856,414 12/1974 Menary .............................. 250/570
4,167,678 9/1979 Mischo et al. ....................... 250/560

Primary Examiner—David C. Nelms
Attorney, Agent, or Firm—Michael J. Striker

[57] ABSTRACT

A system is disclosed which will detect flaws in spliced connections between two adjacent strips of film that are connected together by a splice. The system can, in various embodiments, detect not only a mis-positioning of the splice with respect to the strips, but can also detect whether or not the gap between the strip is too large and whether or not one of the corners of either strip is defectively formed. Additionally, the system can detect a defect arising from the folding over of one of the strips and the installation of a splice on the folded-over portion. The system utilizes radiation sources on one side of the film and radiation detectors on the other side of the film. These sources and detectors are so positioned as to be able to distinguish between the presence of a splice and the absence of a splice, and can also distinguish between the presence of a gap between two adjacent strips and can measure the gap width. By utilizing a system such as is disclosed herein, a continuous-processing machine for use with photographic film may be shut down prior to the introduction therein of a defectively spliced connection, which connection might break during processing.

16 Claims, 15 Drawing Figures

SYSTEM FOR THE DETECTION OF SPLICING DEFECTS IN FILM

BACKGROUND OF THE INVENTION

1. Field of the Invention

This invention pertains to spliced strips of film such as are used in continuous-processing photographic machinery and the like. It is conventional practice in such machines to utilize a plurality of strips of film which are connected end-to-end by splices. In the event that such splices are defective, there is a danger that a splice may give way during processing and thus cause the process to be interrupted. Thus, more specifically, this invention pertains to the field of detection of such defective splices, so that defectively-spliced strips of film are not passed through such machines and subjected to further processing.

2. Background of the Invention

Devices of this type are already known. It is, for example, already known to provide a device of this sort which causes the film strips to be passed along a zig-zag path, so that in the event that a splice is improperly adhered to a strip of film it will be lifted off the film and will trip a lever or other suitable element in order to generate an error signal which can cause the movement of the film in the machine to cease.

However, certain types of defective splices would not be detected by such a machine, and could still break during subsequent processing. For example, if two strips which are spliced together are not separated by a properlysized gap, it is possible that the perforations in the strips of film would not properly engage the toothed rollers that transport the film with the result that the misalignment thus caused could result in damage to the film to be processed. Alternatively, even if the gap were properly sized, it could be that a splice is not properly centered over the gap, in which case the overlap on one side of the splice would be insufficient and the splice would have insufficient adhesion area for proper strength during further processing. This type of defect is particularly troublesome, since a splice which has entirely adequate mechanical holding power prior to processing may, during subsequent processing operations such as development, fixing and bleaching, lose enough of its strength so as to cause subsequent breakage. Additionally, it is possible that the strips themselves, because of defects caused by improper cutting, may have corners which are torn or folded over or actually overlap a corresponding corner of an adjacent strip. These defects can also result in further trouble during subsequent processes operations.

It would thus be advantageous to provide a system which would detect splicing defects of these sorts, so as to increase the likelihood that the subsequent processing operations would remain continuous and so as to prevent improperly-spliced film strips from being subjected to processing.

SUMMARY OF THE INVENTION

It is thus the object of this invention to provide a system which will detect splicing defects caused by improperly located splices and improperly sized gaps between adjacent film strips, and to further detect defects in the spliced strips themselves, whether such defects are caused by improper cutting of the strips, tearing of the corners of the strips, or folding over of the ends of the strips, whether such folding over exists only at the corners of the strips or whether such folding over exists along an entire end of a strip.

In order to accomplish these objects, and others which will become apparent hereinafter, this invention utilizes a plurality of sensors which have different functions. The first type of sensor, namely a gap sensor, responds to the gap between adjacent film strips and produces a gap signal which is a function of the gap width. Moreover, a splice sensor is also utilized, which is responsive to the position of the splice with respect to the gap, and which produces a splice signal which is a function of the splice position. Finally, this invention provides for a congruence computer which processes the signals generated by the sensors and determines whether or not the gap actually sensed and the position of the splice actually observed fall within proper processing tolerances. In the event that the gap is proper and the splice is properly located, the congruence computer produces an output signal which assumes a congruence state. When this signal is in this state, the movement of the film through the subsequent processing machinery is not impeded. However, in the event that either the gap is improperly sized or the splice is improperly located, or both, the congruence computer will produce an output signal having a discongruence state, which signal may trigger an alarm to indicate an improper splice and which signal can further be utilized to shut the processing machinery off, in order to prevent the defectively spliced strip or strips from being subjected to further processing.

Further refinements of this invention utilize additional sensors in order to detect additional types of possible splicing defects. In a further embodiment of the invention, an additional gap sensor is utilized, the two gap sensors being so placed that they measure the gaps which exist between corresponding corners of two adjacent strips which are spliced together. In the event that the gaps at these corners are different, defective corners can be detected and, once again, the processing machinery may be shut down. Additionally, a thickness sensor can be utilized which can detect an end of spliced film strip which is entirely folded over. Thus, even if the gap between two adjacent strips is properly sized, and the splice is properly located, and the corners of adjacent strips are even, the folded over state of one of the strips will be detected and, as in the two cases given above, the processing machinery will be shut down.

It should be noted that this invention presupposes the use of standard splices, which splices are substantially of equal size. Moreover, as will be seen hereinafter, this invention presupposes the use of splices which are less wide than the strips of film which they splice together. Without uniformity in splice characteristics, and without a difference in width between the splices utilized and the strips to be spliced together, the invention disclosed herein will be ineffective to detect the types of splicing defects mentioned above.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF PREFERRED EMBODIMENTS

In the description herein, it will be noted that corresponding elements in all the Figures are always indicated by the same reference numeral.

Figure 1:
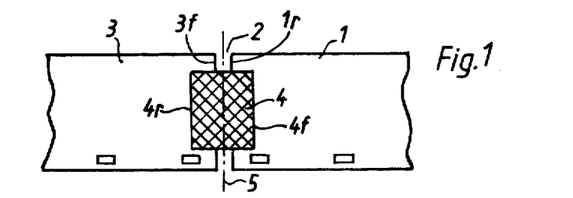
FIG. 1 is a schematic diagram showing two strips of film which are properly spliced together.

In FIG. 1, it can be seen that the leading strip 1 of film and a trailing strip 3 of film are spliced together by a splice 4 which bridges across a gap 2 located between the strips 1 and 3. The leading strip 1 of film has a rear edge 1r and, in a similar fashion, the leading strip 3 of film has a front edge 3f. The front edge of the splice 4 is indicated by the numeral 4f, while the rear edge is indicated by the numeral 4r. As is shown in FIG. 1, the splice 4 is evenly centered on the gap 2 and thus overlaps strips 1 and 3 equally. Since the gap 2 is of the proper width, and since it is evenly bridged by the splice 4, the resulting spliced connection between the strips 1 and 3 is secure and adequately strong for use in continuous processing machinery.

Figure 2A:
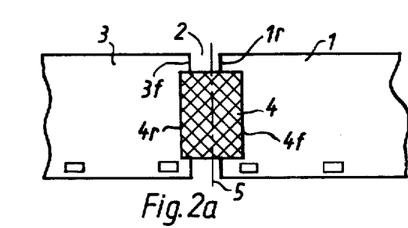
FIG. 2a shows two strips of film which are improperly spliced together because of an intervening gap which is too large.

However, as can be seen in FIG. 2a, occasion does arise when gap 2 is too large. In this case, it can be seen that although the overlap between the splice 4 and the leading strip 1 of film is entirely proper, that the overlap between the splice 4 and the trailing strip 3 of film is inadequate, since the increase of the width of gap 2 results in an inadequate overlap between splice 4 and strip 3. In FIG. 2a, this latter overlap is inadequate, and will give way during subsequent processing in a continuous-processing machine.

Figure 2B:
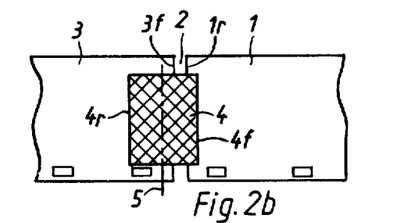
FIG. 2b shows two strips of film which are improperly spliced together because of an improper location of a splice with respect to the strips.

In FIG. 2b, it can be seen that the gap 2 is of the proper width, but that the splice 4 does not evenly bridge the gap 2 and, instead, has an excessive overlap with trailing strip 3, which excessive overlap results in an insufficient overlap between splice 4 and leading strip 1. Thus, it may be seen that the connection shown in FIG. 2b will be inadequately strong, and the leading strip 1 will in all likelihood separate from splice 4 during subsequent processing in a continuous-processing machine.

Figure 3:
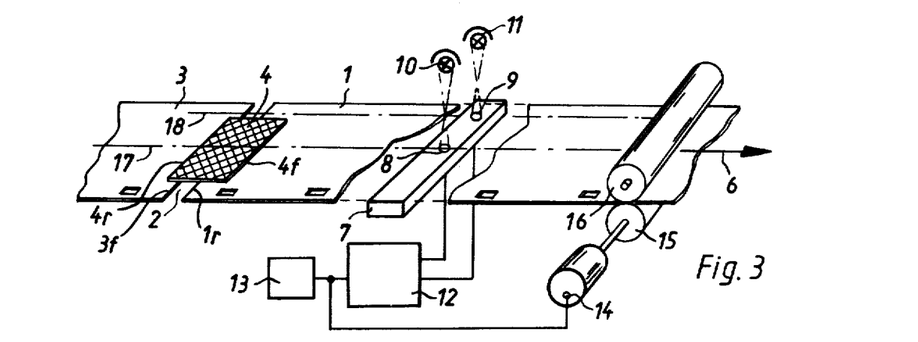
FIG. 3 is a schematic diagram of a first embodiment of this invention.

In order to detect these flaws, the mechanisms illustrated schematically in FIG. 3 are provided. It can be seen in FIG. 3 that the strips 1 and 3 of film, which strips are joined together by the splice 4, are passed along a path 6, travelling towards the right-hand portion of FIG. 3. Although the film strips are here shown to be moving in a horizontal direction, this showing is not intended to be restrictive and the path may be vertically oriented and indeed may be curved. On one of the sides of the film are located two sources 10 and 11 of radiation, which sources will be described below in greater detail. On the other side of the film, it can be seen that an elongated rail 7 extends transversely to the film path, and that the film strips 1 and 3 and the splice 4 thus are interposed between the sources 10 and 11 and the rail 7.

The rail 7 contains two sensors, namely a gap sensor 9 and a splice sensor 8. Sensors 9 and 8 may be photocells, phototransistors, or any other suitable sensors. It is to be noted that sensors 8 and 9 may either be of the type which produce output signals as a result of impinging radiation, or may be of the type which merely turn a current on and off depending upon whether or not radiation impinges upon them. As will be seen hereinafter, it is only necessary that the sensors 8 and 9, whether connected by themselves or in series with a power source, generate time-varying signals, dependent upon received radiation.

As is also indicated schematically in FIG. 3, two elongated rollers 15 and 16 serve to draw the film along the path. Rollers 15 and 16 are also oriented transversely to the path of the film, with rollers 16 being located on the same side of the film as sources 10 and 11 and roller 15 being located on the same side of the film as rail 7. Roller 16, as is shown in FIG. 3, is a passive element which is rotatably mounted on its axis. Roller 15, however, is driven by a drive control 14, which can turn the roller 15 and thereby move the film.

As can be seen in FIG. 3, splice sensor 8 is located at that point in rail 7 which corresponds to the center of the strips 1 and 3 of the film. The gap sensor 9, on the other hand, is located adjacent one longitudinal edge of the film. Source 10 is aligned with splice sensor 8, while source 11 is aligned with gap sensor 9. It may now be seen that, as the film strips pass between the sources 10 and 11 and the rail 7 with the sensors mounted thereon, that either the film alone or the film and the splice will always be interposed between source 10 and the splice sensor 9, whereas gaps will occasionally allow the space between the gap sensor 9 and source 11 to be uninterrupted by film. In this connection, it can be seen that the film shown in FIG. 3 is perforated parallel to only one longitudinal edge. As shown, the film herein is the 110 format, which is perforated as shown. In the event that it is desired to utilize a film format which is conventionally perforated parallel to both longitudinal edges, it is important that the source 11 and gap sensor 9 be so located as to never be located over one of the perforations. In other words, the gap sensor 9 and source 11 will either be located between a second set of perforations and the splice or will be located between the additional perforations and the longitudinal edge of the film.

In conventional practice, the film utilized is such that it is essentially transparent to certain wavelengths of infra-red radiation. On the other hand, the splices used to join the strips of film are opaque to such radiation. Thus, if source 10 and splice sensor 8 are so designed that they respectively produce and are sensitive to infra-red radiation, that the presence or absence of a splice intermediate the two can be detected as an abrupt drop in the current flowing through splice sensor 8.

Source 11 and gap sensor 9 are not designed to operate on such an infra-red wavelength, since it is the purpose of the gap sensor 9 to distinguish between the presence of film adjacent its location and the presence of a gap adjacent its location. For that reason, source 11 is simply a very weak source of conventional radiation and gap sensor 9 is a very sensitive detector thereof. Whenever film is interposed between source 11 and gap sensor 9, no radiation can reach gap sensor 9 and therefore the current passing through it will be low. However, as soon as a gap passes between source 11 and gap sensor 9, the current passing through gap sensor 9 will abruptly increase, and will remain at a higher level until the next strip of film is interposed between source 11 and gap sensor 9.

Figure 4A:
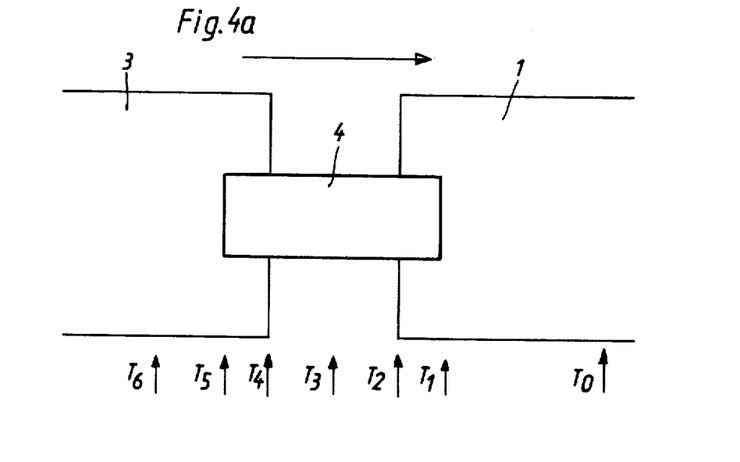
FIG. 4a shows, in an enlarged view, two strips of film which are spliced together by a splice, showing the relative times at which the strips and splices trigger the sensors described in this first embodiment of the invention.
Figure 4B:
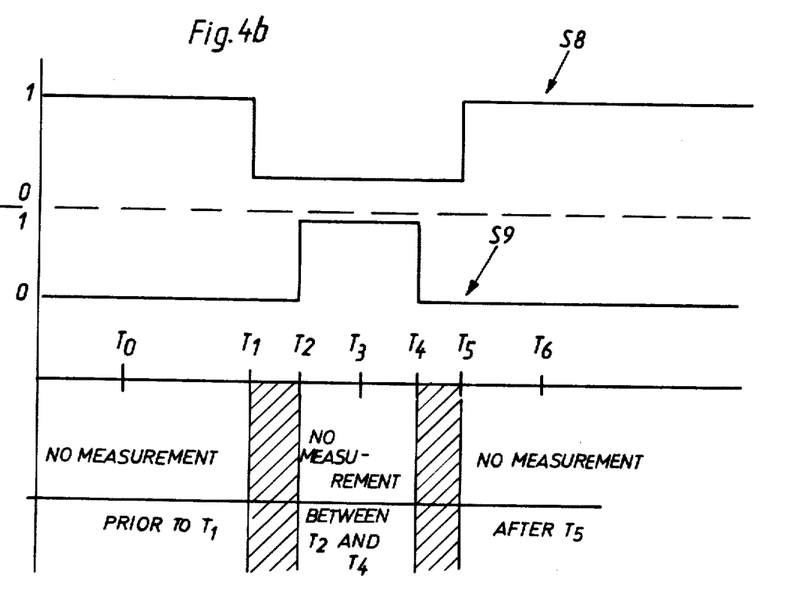
FIG. 4b shows the signals produced by the sensors in this first embodiment of this invention, and also shows the period of time during which the overlap between a splice and a strip is measured.

Thus, the splice sensor 8 and the gap sensor 9 produce signals of opposite phase, which signals correspond to the existence or non-existence of a gap and splice at, respectively, the locations of gap sensor 9 and splice sensor 8. Referring to FIG. 4a, it can be seen that for any leading strip 1 of film, the first region to pass between the sources 10 and 11 and the reel 7 will be that portion of strip 1 which is located forwardly of the splice 4. In this situation, as can be seen in FIG. 4b, the splice sensor 8 will produce a splice signal S8 which has a high value, while the gap sensor 9 will produce a gap signal S9 which has a low value. At time T1, edge 4f will be interposed between source 10 and gap sensor 8, and will immediately cause the gap signal S9 to drop. Lately, at time T2, the rear edge 1r of the strip 1 of film will pass over the sensors, and the output of gap sensor 9 will abruptly increase. At time T3, the gap sensor 9 will indicate the presence of a gap while the splice sensor 8 will indicate the presence of a splice. Later, at time T4, the front edge 3f of the trailing strip 3 of film will pass over the sensors, causing the gap signal S9 to drop while splice signal S8 remains at its low value. At later time T5, rear edge 4r of the splice 4 will pass over the sensors, and the gap signal S9 and splice signal S8 will return to their original values.

Thus, it can be seen that the outputs of the two sensors are independent of each other and indicate different things. With the information thus obtained, it will be possible to determine whether or not the gap 2 is properly sized and whether or not the splice 4 evenly bridges across the gap. However, it should be noted that an underlying assumption of the invention as used herein is that the two strips 1 and 3 of film are indeed mechanically connected together by a splice 4. Thus, it will always be true that the gap 2, if there is one, will always exist between the front and rear edges 4f and 4r of the splice 4. For that reason, it is possible to use the abrupt change in splice signal S8 to turn source 11 on and off, so as not to wear source 11 out prematurely by constant and unnecessary operation, and so as to avoid any accidental exposure of central portions of any strip of film.

FIG. 4b also shows, in its lower portion, two shaded bands existing between times T1 and T2 on the one hand and T4 and T5 on the other hand. These two shaded bands represent the time periods during which the gap and splice signals indicate that a splice is overlapping a film strip. It will be obvious to one skilled in the art that if the overlap between splice 4 and leading strip 1 is insufficient, the period between T1 and T2 will be too small, and it will also appear that the same conditions govern the overlap between splice 4 and trailing strip 3, vis-a-vis the interval between T4 and T5. At this point, the simplest case occurs where the speed of the film pass rail 7 is constant. If this is the case, it can be immediately seen that the physical overlap between the splice 4 and the strips 1 and 3 is directly proportional to the period of time between T1 and T2, and between T4 and T5. Thus, with film speed constant, it is only necessary to measure the overlap periods which are represented by the shaded bands in FIG. 4b. If the overlap between leading strip 1 and splice 4 is either too great or too small, the left-hand band shown in FIG. 4b will be either too wide or too narrow. The same holds true for the band shown in the right-hand portion of FIG. 4b. Hence, in this simplest case, the problem of measuring the physical overlaps between the splice and the film strips reduces to the problem of timing the period of anti-congruance between splice signal S8 and gap signal S9.

Figure 5A:
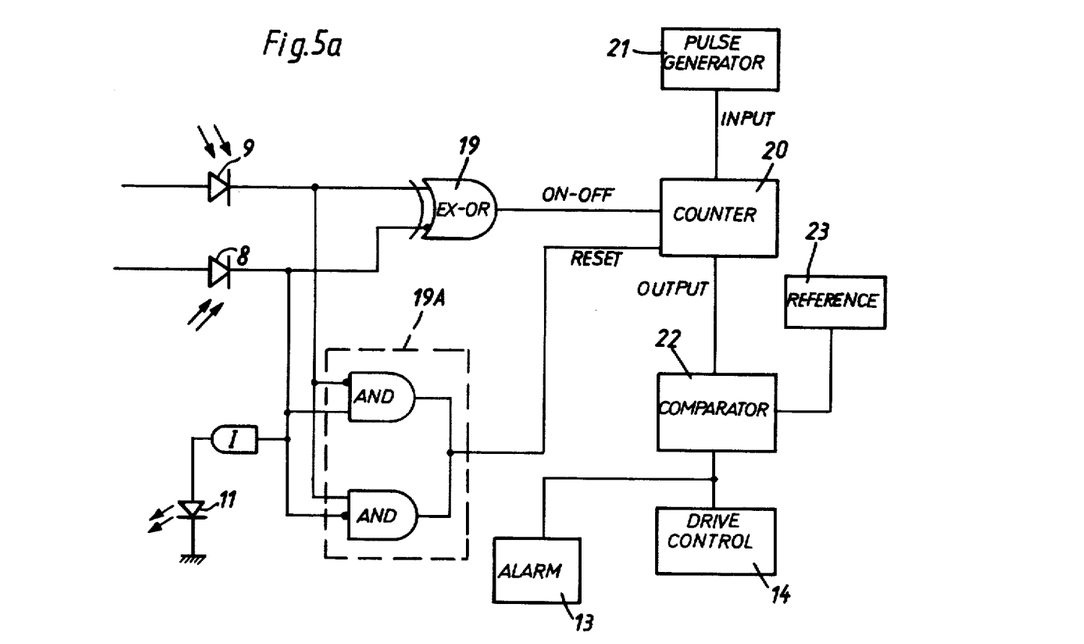
FIG. 5a shows a block diagram of a congruence computer suitable for use with the first embodiment of the invention in which the film strips are transported at constant speed.

A block diagram of a congruance computer which accomplishes this function is shown in FIG. 5a. As can be seen therein, the outputs of the gap sensor 9 and the splice sensor 8 are fed to the inputs of an exclusive OR-gate 19, with the input being fed by gap sensor 8 being inverted. It will be noted that the normal condition for the gap signal S9 and the splice signal S8 will be congruant, i.e. they will ordinarily be opposite to each other, with the gap signal S9 being low and the splice signal S8 being high. Moreover, these two signals will be congruant during the perod intermediate times T2 and T4, i.e. while only a splice is passing over rail 7. When an overlap occurs, the gap signal S9 and the gap signal S8 will be anti-congruant. One skilled in the art will readily perceive that the output of exclusive OR-gate 19 will only be equal to 1 during these periods of overlap. Otherwise, the output of gate 19 will be 0. The output of gate 19 is routed to a counter 20, which can count pulses generated by pulse generator 21. Many chips which will serve the function of counter 20 are now manufactured, and the selection of a suitable chip is deemed to be within the knowledge of one skilled in the art.

It can be seen in FIG. 5a that network 19A consists of two AND-gates in parallel with each other and having outputs connected to a reset line connected to counter 20. Counter 20 is so designed that when gate 19 has turned on, the counter 20 will proceed to count pulses generated by the pulse generator 21. When gate 19 is off, the counter 20 is frozen at the count which it has reached. This count may be compared in comparator 22 with the desired number of counts programmed into reference 23. In the event that the counter 20 counts a number of pulses which is either in excess of or less than the number of counts programmed into reference 23, the comparator 22 will indicate the discrepancy by shutting down the drive control 14 and sounding an alarm 30. On the other hand, if no discrepancy exists, the film is kept moving along its path at constant speed. It may now be seen that network 19A serves to zero the counter 20 intermediate regions of anti-congruance between the gap signal S9 and the splice signal S8 so as to enable the counter to accurately reflect the periods of overlap individually.

As was mentioned above, it is only necessary that source 11 be turned on when the splice sensor 8 detects a splice at rail 7. Thus, an inverter connected to the output of splice sensor 8 and to source 11 can be used to turn source 11 on and off as the splice signal S8 varies.

It will be obvious to one skilled in the art that as long as appropriate power supplies are provided, gate 19 and network 19A may be driven by any suitable sensors. Moreover, it will be obvious to one skilled in the art that the schematic diagram shown in FIG. 5a may be varied, depending upon the type of sensors and sources used. Thus, the diagram shown in FIG. 5a is intended only for purposes of illustration, and is merely one embodiment which can be utilized in order to properly time the periods of congruance and anti-congruance between gap signal S9 and splice signal S8.

Figure 5B:
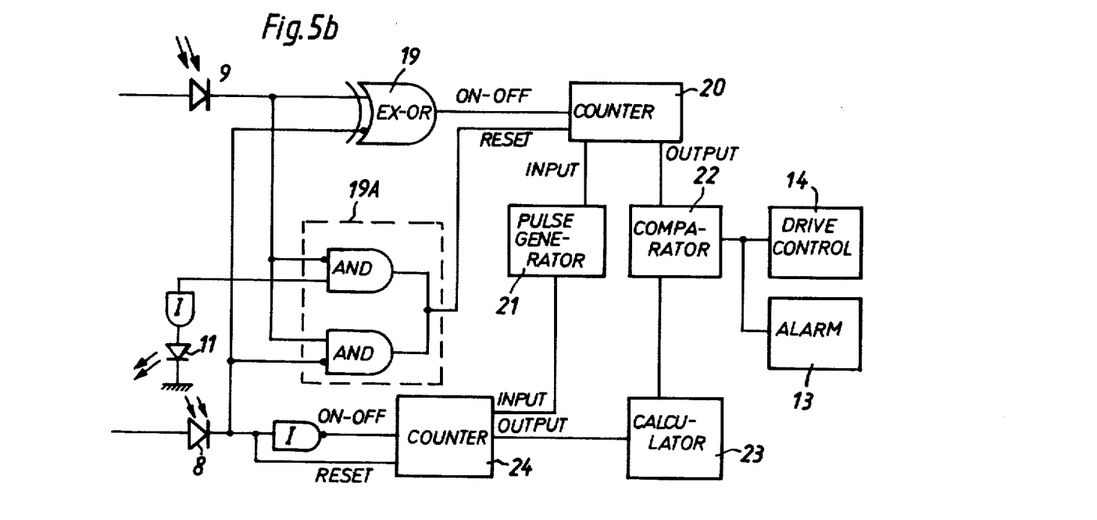
FIG. 5b shows a block diagram of a congruence computer suitable for use with this first embodiment of the invention when the strips are transported at a varying speed.

It is also possible that the rate of speed of the film may vary. In this event, the diagram shown in FIG. 5a would be inappropriate since with varying film speed, the pulses counted by counter 20 would have no meaning. However, this invention contemplates the use of splices 4 which are all of identical length. Thus, the length of a splice, as measured by the output of splice sensor 8 and splice signal S8, can be used as a benchmark in order to provide a basis for comparison. To this end, a second embodiment of the congruance computer, such as is shown in FIG. 5b, can be used.

In this embodiment, gate 19, network 19A, counter 20, and pulse generator 21 all serve their previous functions. However, as will be seen hereinafter, comparator 22 must not only serve as a comparator, but must also serve as a memory. Additionally, the embodiment shown in FIG. 5b differs from the embodiment shown in FIG. 5a because the comparator 22 does not compare the contents of counter 20 with a fixed reference 23, but rather with a number which is calculated by calculator 23'. Calculator 23' is fed by another counter 24, which in turn is turned on and off depending upon the status of splice sensor 8.

In this second embodiment of the congruance computer, splice sensor 8 turns counter 24 on and off depending upon whether or not a splice is sensed at rail 7. Counter 24 is kept counting during the time that a splice is sensed at rail 7. Since the length of all the splices are constant, the contents of counter 24 will be proportional to the speed of the film, and thus calculator 23' can properly calculate a number which ought rightfully to be compared with the contents of counter 20 during each of the two periods of overlap between the splice 4 and the strips 1 and 3 of film. In operation, the counter 20 is turned on and off and the two sequences of counts thus counted are stored in comparator 22'. After counter 24 has been turned off, the calculator 23' can calculate the number of pulses which are to be observed during each overlap period between the splice 4 and strips 1 and 3. This calculated number of pulses can thus be compared with each of the two series of pulses counted during the overlap periods, and the drive control 14 and alarm 30 sounded in the event that the resulting comparisons indicate improper overlaps between the splice 4 and the strips 1 and 3.

As in FIG. 5a, this second embodiment of the congruance computer is susceptible to variations, depending upon the kinds of circuits available. It is only important here to note that once the principle of keeping track of the outputs of gap sensor 9 and splice sensor 8 has been established, appropriate circuitry for turning the drive control 14 on and off and sounding the alarm 30 can be devised, given the proper initial conditions regarding congruance and anti-congruance of gap signal S9 and splice signal S8.

Because of errors caused by the cutting of the various film strips, it is possible that corners may be torn off and that overlaps between adjacent strips may occur. It is furthermore possible that a portion of, or indeed an entire end of, a given film strip may be folded over upon itself. It is clearly desirable to detect such errors. In the event that the errors occur on that longitudinal side of the film strip which is most remote from the gap sensor 9 as is described in the first embodiment of this invention, such flaws will not be detected and the strips may be subject to breakage during subsequent continuous processing. In order to detect these types of defects, a second embodiment of this invention utilizes two gap sensors, located adjacent opposite longitudinal edges of the film.

Figure 7:
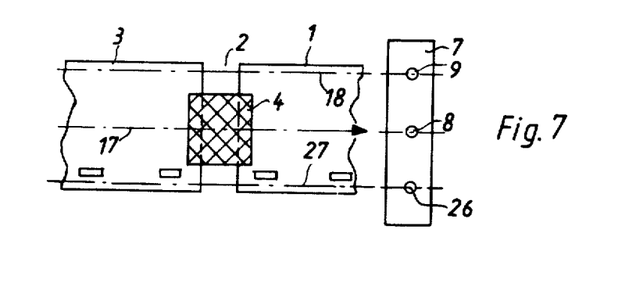
FIG. 7 shows a portion of the second embodiment of this invention which is designed to detect such defects as are shown in FIGS. 6a–6c.

As can be seen in FIG. 7, a first gap sensor 9 is located in its previous location, as is splice sensor 8. However, a second gap sensor 26 is also located on rail 7 inbetween the perforations of the film and the adjoining longitudinal edge thereof. As before, if the film is perforated along both longitudinal edges, the first gap sensor 9 is located intermediate the perforations and the edge, in order to avoid interpreting perforations as gaps between adjacent strips of film. The purpose of the first gap sensor 9 and the second gap sensor 26 is to enable the width of the gap 2 between two adjacent strips 1 and 3 of film to be measured at the ends of the gap, and the measurements subsequently compared. It should be noted that this comparison occurs completely independently of all other observations made regarding the proper overlap of splice 4 with strips 1 and 3 of film.

Second gap sensor 26 is of the same type of first gap sensor 9, and has, of course, a corresponding source located on the other side of the film. The second gap sensor 26, like the first gap sensor 9, is only turned on after a splice has been detected by splice sensor 8 at rail 7.

Figure 6A:
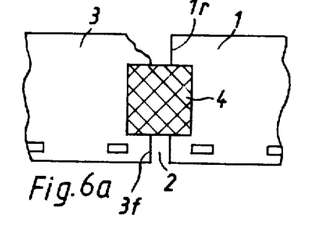
FIG. 6a shows an enlarged view of a defect between two strips of film which are spliced together, which defect is caused by a corner of the trailing strip being torn off during the cutting process.
Figure 7A:
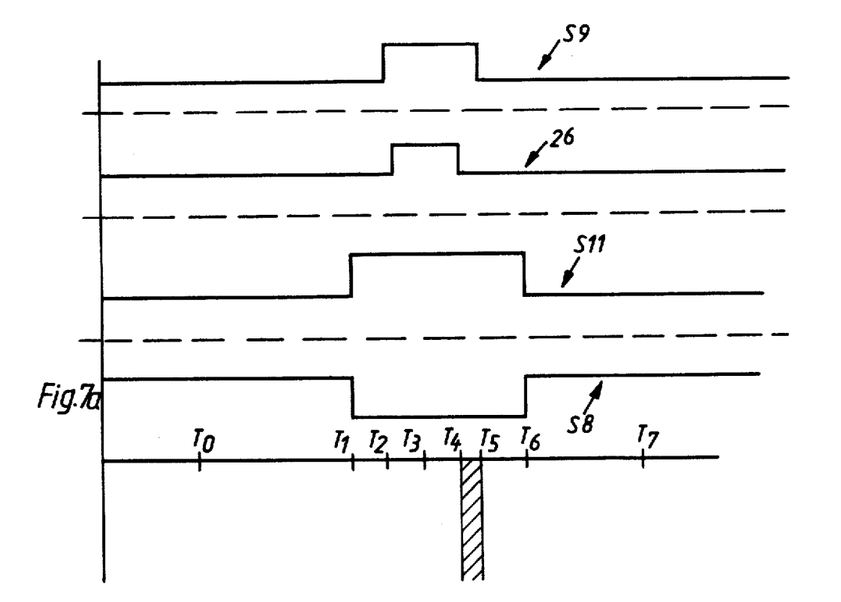
FIG. 7a shows a graph of the signals produced by the sensors in this second embodiment of this invention as a result of the defects shown in FIGS. 6a and 6b.

As can be seen in FIG. 6a, the top corner of front edge 3f of film strip 3 may be torn off because of a defective cutting operation. In this case, the gap 2 will appear wider at one end than the other, and thus the outputs of the first gap sensor 9 and the second gap sensor 26 will differ from each other. When reference is had to FIG. 7a, it can be seen that the defect shown in FIG. 6a will produce two gap signals, namely S9 and S26 which will differ from each other during the period shown as a shaded band in FIG. 7a. The anti-congruance between first gap signal S9 and second gap signal S26 during the period shown as a shaded band in FIG. 7a can be used in a suitably designed congruance computer to shut the drive control 14 down. Thus, in a congruance computer to which the portion of the second embodiment of the invention shown in FIG. 7a is connected will not only measure the overlaps between the splice 4 and the strips 1 and 3 of film, but will also measure the congruance between the first gap signal S9 and the second gap signal 26 and will shut the drive control 14 down unless both the overlaps between the splice 4 and the strips 1 and 3 are proper and unless, in addition, there is always a congruance between first gap signal S9 and second gap signal S26. Such a congruance computer, although not illustrated here, can be easily designed by one skilled in the art for either a system with a constant film speed or, alternatively, a system with variable film speed that uses identical splices with a constant length that is used as a benchmark as is described before.

Figure 6B:
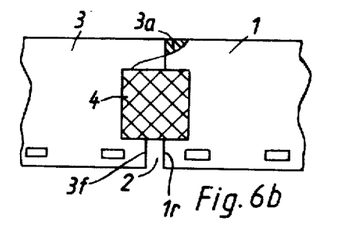
FIG. 6b shows a similar defect also caused by a defective corner of the trailing strip, wherein the defect is caused by an overlap between two corresponding corners of the strips.
Figure 6C:
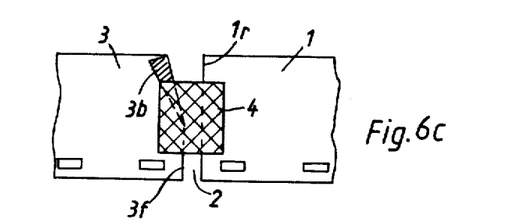
FIG. 6c shows a defect similar in nature to the defect shown in FIG. 6a, in which the defect is caused not by a torn-off corner but rather by a folded-over corner.
Figure 7B:
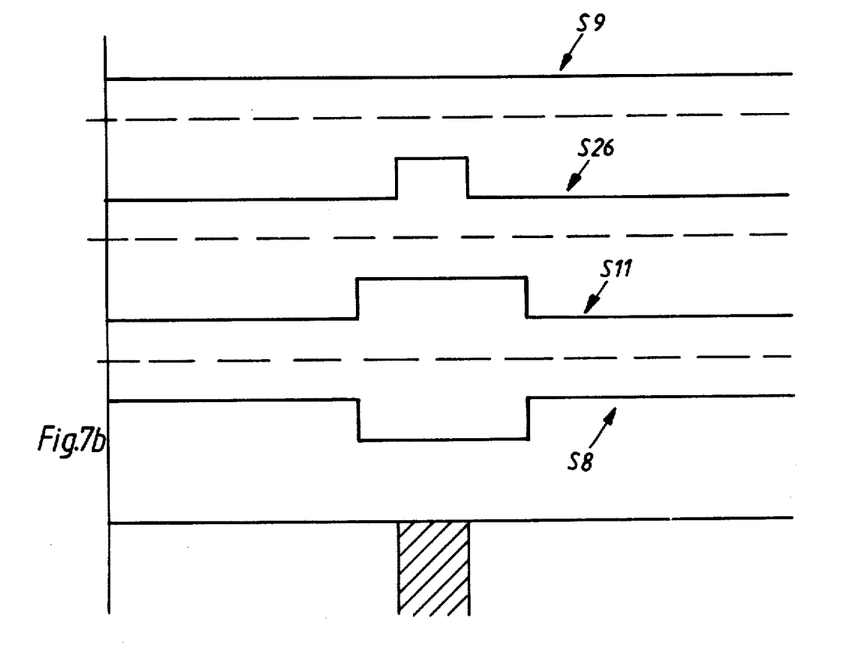
FIG. 7b shows a graph of the signals produced by the sensors in this second embodiment of this invention as a result of the defect shown in FIG. 6b.

The defect shown in FIG. 6b, namely an overlapping between two adjacent corners of edges 3f of strip 3 and 1r of strip 1 will result in the output signal shown in FIG. 7b. As can be seen there, first gap sensor 9 will never detect any gap, since the overlap between the two adjacent strips 1 and 3 of film will prevent the gap sensor 9 from ever detecting the presence of a gap. Thus, first gap signal S9 will never change, and will always remain 0 during the relevant period. This anti-congruance between first gap signal S9 and second gap signal S26 is reflected in the shaded band shown in FIG. 7b, and, in the fashion described above, this anti-congruance can be picked up in a suitably designed congruance computer to shut the drive control 14 down.

Before discussing the third embodiment of the invention disclosed herein, it is appropriate to review the types of defects which the second embodiment of the invention will detect. In the event that a splice improperly bridges a gap 2 between a leading strip 1 of film and a trailing strip 3 of film, the improper centering will be detected and the drive control 14 will be shut down. In the event that a corner of one of the strips is torn off, or is folded over, or is overlapped with an adjacent corner, the width of the gap 2 will be unequal along its length. Thus, these types of defects will be detected also, and will be detected independently of the improper positioning, if any, of the splice 4 relative to the strips 1 and 3 of film. However, one serious type of defect will not be detected, namely a defect in which an entire end of one of the strip 1 and 3 of film is uniformly folded over upon itself to form a rectangular double thickness of film. Such a defect would have a gap of uniform width, and would thus not be detected as a flaw by the gap sensor 9 and 26. Moreover, such a defect could easily have a splice properly positioned relative to the two strips of film, and thus this type of defect would not be detected by the splice sensor. In order to detect this type of defect, an arrangement such as is illustrated in FIG. 8 is provided.

Figure 8:
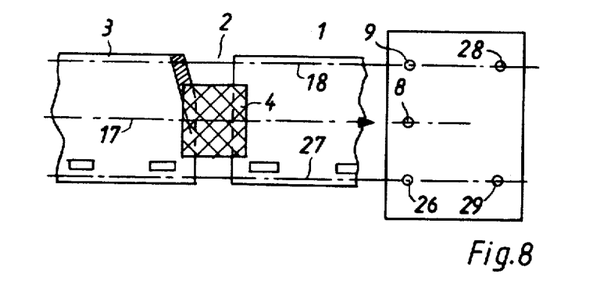
FIG. 8 shows a portion of a third embodiment of this invention.

In FIG. 8, two additional thickness sensors 28 and 29 are located on rail 7, directly forwardly of the first gap sensor 9 and the second gap sensor 26. These thickness sensors 28 and 29 cooperate with thickness sources (not shown) in a fashion similar to the cooperation between gap sensor 8 and source 10. The thickness sources are sufficiently strong so that thickness sensors 28 and 29 will normally have high outputs. However, in the event that a double thickness of film is interposed between the thickness sources and the thickness sensors 28 and 29, the sources are insufficiently strong to cause radiation to impinge upon the thickness sensors 28 and 29. In that event, the outputs of thickness sensors 28 and 29 will drop. Thus, when this drop is detected, it can also be used as another one of the anti-congruance conditions which can shut the drive control 14 down and sound the alarm 13. Hence, in a congruance computer which is connected to this embodiment of the invention, a further condition of congruance must always be a high output signal through thickness sensors 28 and 29. In the event that the output from either one of these thickness sensors 28 or 29 is low, the drive control 14 may be shut down. Thus, this third embodiment will detect flaws of the types already discussed, and additionally detect a flaw which the other embodiments do not detect, namely, the folding over of one of the edges of a film strip.

It will be understood that each of the elements described above, or two or more together, may also find a useful application in other types of constructions differing from the types described above.

While the invention has been illustrated and described as embodied in a "System for the Detection of Splicing Defects in Film", it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system for identifying a defective splice which improperly bridges a gap located between a leading strip of film and a trailing strip of film, and for identifying an improper gap, when the strips are moving at a constant rate past a fixed line segment located on and oriented transversely to a path along which the strips travel, the path dividing an imaginary line which intersects the line segment and is oriented normally with respect to the path into a first side and a second side, comprising:

a gap sensor producing a time-varying gap signal with a gap stage and a strip state, the gap signal assuming the strip state whenever a strip is located at the line segment and assuming the gap state whenever a gap is located at the line segment;

a splice sensor producing a time-varying splice signal with a splice state and a non-splice state, the splice signal assuming that splice state whenever a splice is located at the line segment and assuming the non-splice state otherwise; and a congruance computer responsive to the gap signal and splice signal and producing an output signal with a congruance state and a discongruance state, the output signal assuming the congruance state when and only when the splice is properly bridging the gap and the gap is proper, and assuming the discongruance state otherwise.

2. The system defined by claim 1, further including a drive and a drive control, the drive cooperating with the strips to move them along the path, and the drive control cooperating with the drive and the congruance computer to turn the drive on to move the strips when the output signal is in the congruance state and to turn the drive off to stop the strips when the output signal is in the discongruance state.

3. The system defined by claim 2, further including an alarm responsive to the output signal in a manner that the alarm is off when the congruance signal is in the congruance state and the alarm is on when the congruance signal is in the discongruance state.

4. The system defined by claims 1, 2 or 3 wherein each of the sensors has a pair of corresponding first and second components which are aligned with each other with the first component being located on the first side and the second component being located on the second side, each first component being a source of radiation and each second component being a detector of radiation, the first components being located on a first line which is parallel to the line segment and passes through the imaginary line on the first side, and the second components being located on a second line which is parallel to the line segment and passes through the imaginary line on the second side.

5. The system defined by claim 4, wherein the strips are moving at a rate which may vary, the system further including a speed sensor responsive to movement of the strips and splices and generating a speed signal in response thereto, and wherein the congruance computer is further responsive to the speed signal.

6. The system defined by claim 1, wherein the system further detects defective corners of the strips produced by tearing, overlapping and folding, and wherein the gap sensor is located adjacent a first end of the line segment and thereby indicates the location of gaps and strips adjacent said first and further including an additional gap sensor located adjacent a second end of the line segment which is opposed to the first end thereof and which produces a time-varying additional gap signal with a strip state and a gap state, which additional gap signal assumes the strip state whenever a strip is located adjacent said second end and assuming the gap state whenever a gap is located adjacent said second end and thereby indicates the location of gaps and strips adjacent said second end, and wherein the congruance computer is further responsive to the additional gap signal and produces an output signal which assumes the congruance state when and only when the splice is properly bridging the gap and the gap is proper at both the first end and the second end, the output signal assuming the discongruance state otherwise.

7. The system defined by claim 6, further including a drive and a drive control, the drive cooperating with the strips to move them along the path, and the drive control cooperating with the drive and the congruance computer to turn the drive on to move the strips when the output signal is in the congruance state and to turn the drive off to stop the strips when the output signal is in the discongruance state.

8. The system defined by claim 7, further including an alarm responsive to the output signal in a manner that the alarm is off when the congruance signal is in the congruance state and the alarm is on when the congruance signal is in the discongruance state.

9. The system defined by claims 6, 7 or 8 wherein each of the sensors has a pair of corresponding first and second components, which are aligned with each other with the first component being located on the first side and the second component being located on the second side, each first component being a source of radiation and each second component being a detector of radiation, the first components being located on a first line which is parallel to the line segment and passes through the imaginary line on the first side, and the second components being located on a second line which is parallel to the line segment and passes through the imaginary line on the second side.

10. The system defined by claim 9, wherein the strips are moving at a rate which may vary, the system further including a speed sensor responsive to movement of the strips and splices and generating a speed signal in response thereto, and wherein the congruance computer is further responsive to the speed signal.

11. The system defined by claim 6, wherein the system further detects strips having non-defective corners and bent ends, further including a thickness sensor responsive to the thickness of a strip adjacent the line segment and producing a time-varying thickness signal which has a doubled state and a normal state, the thickness signal assuming the doubled state when a strip with a bent end passes the thickness sensor and assuming the normal state otherwise, and wherein the congruance computer is further responsive to the thickness signal and produces an output signal which assumes the congruance state when and only when the splice is properly bridging the gap and the gap is proper at both the first end of the line segment and the second end of the line segment and the thickness signal is in its normal state, and assumes the discongruance state otherwise.

12. The system defined by claim 11, wherein the thickness sensor is responsive to optical transmission characteristics of the strips.

13. The system defined by claim 12, further including a drive and a drive control, the drive cooperating with strips to move them along the path, and the drive control cooperating with the drive and the congruance computer to turn the drive on to move the strips when the output signal is in the congruance state and to turn the drive off to stop the strips when the output signal is in the discongruance state.

14. The system defined by claim 13, further including an alarm responsive to the output signal in a manner that the alarm is off when the congruance signal is in the congruance state and the alarm is on when the congruance signal is in the discongruance state.

15. The system defined by claims 11, 12, 13 or 14, wherein each of the sensors has a pair of corresponding first and second components which are aligned with each other with the first component being located on the first side and the second component being located on the second side, each first component a source of radiation and each second component being a detector of radiation, the first components being located on a first line which is parallel to the line segment and passes through the imaginary line on the first side, and the second components being located on a second line which is parallel to the line segment and passes through the imaginary line on the second side.

16. The system defined by claim 15, wherein the strips are moving at a rate which may vary, the system further including a speed sensor responsive to movement of the strips and splices and generating a speed signal in response thereto, and wherein the congruance computer is further responsive to the speed signal.

* * * * *